(12) United States Patent
Huang (10) Patent No.: US 7,445,034 B1
(45) Date of Patent: Nov. 4, 2008

(54) BICYCLE WHEEL WITHOUT AN INNER TIRE

(76) Inventor: Yu-Shan Huang, 11, Quanfu St., Changhua City, Changhua County (TW)

( * ) Notice: Subject to any disclaimer, the term of this patent is extended or adjusted under 35 U.S.C. 154(b) by 15 days.

(21) Appl. No.: 11/654,264

(22) Filed: Jan. 17, 2007

(51) Int. Cl.
B60C 5/16 (2006.01)
B60B 21/10 (2006.01)
B60B 21/12 (2006.01)

(52) U.S. Cl. ............ 152/381.5; 152/379.5; 301/95.106
(58) Field of Classification Search ............... 301/58, 301/95.104, 95.106; 152/379.3, 379.4, 379.5, 152/381.4, 381.5, 381.6, 382, 394, 400, DIG. 9, 152/DIG. 16
See application file for complete search history.

(56) References Cited

U.S. PATENT DOCUMENTS

| 2,937,905 | A | * | 5/1960 | Altenburger | ................. 301/58 |
|---|---|---|---|---|---|
| 3,335,778 | A | * | 8/1967 | Blagden et al. | ............. 152/513 |
| 3,965,957 | A | * | 6/1976 | Nakasaki | ..................... 152/400 |
| 5,538,058 | A | * | 7/1996 | Aloy | ........................ 152/381.5 |
| 7,104,300 | B2 | * | 9/2006 | Veux et al. | ............... 152/379.4 |
| 2004/0004391 | A1 | * | 1/2004 | Fioravanti | ............. 301/95.104 |
| 2005/0189813 | A1 | * | 9/2005 | Bauer | .................... 301/95.104 |

* cited by examiner

Primary Examiner—Russell D. Stormer
Assistant Examiner—Kip T Kotter
(74) Attorney, Agent, or Firm—Alan Kamrath; Kamrath & Associates PA (57) ABSTRACT

A bicycle wheel includes a wheel rim, a lining strap, and a tire. Thus, each of the edges of the lining strap is clamped in the clamping space of the respective clamping hook of the wheel rim and closely retained by the respective clamping hook of the wheel rim and the respective sidewall of the opening, and the protruding lips of the tire are movable freely on the smooth face of the lining strap, so that when the tire is subjected to an external force, the lining strap will not driven by the tire to prevent a gap from forming between the lining strap and the tire and to prevent the air contained in the tire from leaking from the mounting holes of the wheel rim.

17 Claims, 7 Drawing Sheets

BICYCLE WHEEL WITHOUT AN INNER TIRE

BACKGROUND OF THE INVENTION

1. Field of the Invention

The present invention relates to a bicycle wheel and, more particularly, to a bicycle wheel without an inner tire.

2. Description of the Related Art

A conventional bicycle wheel in accordance with the prior art shown in FIGS. 7-10 comprises a wheel rim 50 having an outer wall formed with an opening 54 which has two opposite sidewalls each having a distal end formed with a resting edge 53 and an inner wall having an outer rim and an inner rim each formed with a plurality of fixing holes 51 for fixing a plurality of spokes 52, a lining 60 mounted in the opening 54 of the wheel rim 50 and having a face formed with two protrusions 61, and a tire 70 mounted on the wheel rim 50 and having two opposite distal ends each formed with a protruding lip 71 rested on the lining 60 and located between the respective resting edge 53 of the wheel rim 50 and the respective protrusion 61 of the lining 60.

Figure 10:
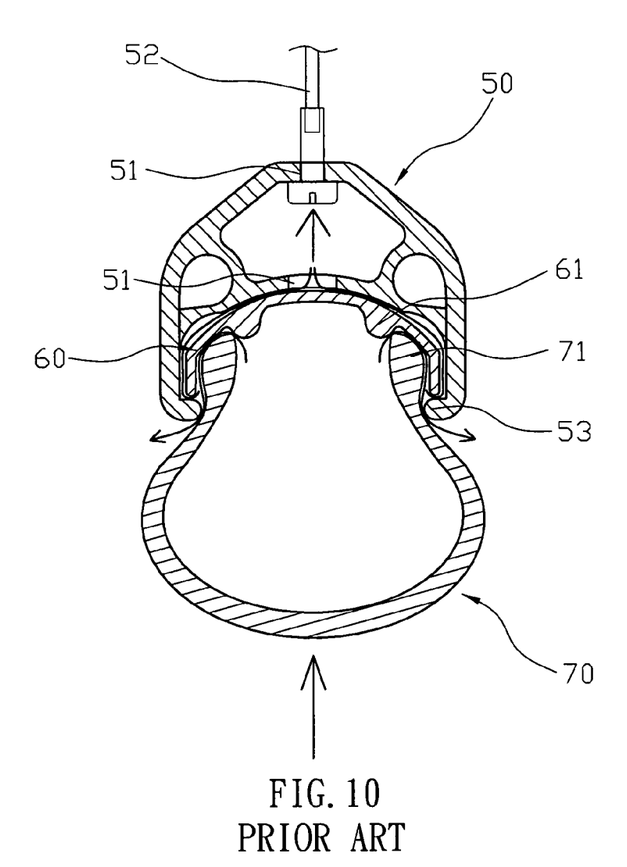
FIG. 10 is a schematic operational view of the conventional bicycle wheel as shown in FIG. 9.

As shown in FIG. 10, when the bicycle is ridden on a rugged road, a force is applied on the tire 70 so that the tire 70 is deformed and moved upward relative to the lining 60 and the wheel rim 50. At this time, the protruding lip 71 of the tire 70 is located between the respective resting edge 53 of the wheel rim 50 and the respective protrusion 61 of the lining 60, so that when the tire 70 is deformed and moved upward relative to the lining 60 and the wheel rim 50, the respective protrusion 61 of the lining 60 is driven by the protruding lip 71 of the tire 70, and the lining 60 is moved rightward and leftward relative to the wheel rim 50 to define a gap between the wheel rim 50 and the lining 60. Thus, the air contained in the tire 70 will leak from the fixing holes 51 of the wheel rim 50. In addition, when the tire 70 is deformed and moved relative to the wheel rim 50, the air contained in the tire 70 will leak from the gap between the protruding lip 71 of the tire 70 and the respective resting edge 53 of the wheel rim 50.

BRIEF SUMMARY OF THE INVENTION

In accordance with the present invention, there is provided a bicycle wheel, comprising a wheel rim having an outer wall formed with an opening which has two opposite sidewalls each having a distal end formed with a protruding clamping hook to define a clamping space between the clamping hook and the respective sidewall of the opening, a lining strap mounted in the opening of the wheel rim and having two opposite edges each clamped in the clamping space of the respective clamping hook of the wheel rim and each closely retained by the respective clamping hook of the wheel rim and the respective sidewall of the opening, and a tire mounted on the wheel rim and having two opposite distal ends each formed with a protruding lip rested on a respective edge of the lining strap and hooked on the respective clamping hook of the wheel rim to attach the tire to the wheel rim.

The primary objective of the present invention is to provide a bicycle wheel, wherein each of the edges of the lining strap is clamped in the clamping space of the respective clamping hook of the wheel rim and closely retained by the respective clamping hook of the wheel rim and the respective sidewall of the opening, and the protruding lips of the tire are movable freely on the smooth second face of the lining strap, so that when the tire is subjected to an external force, the lining strap will not driven by the tire to prevent a gap from forming between the lining strap and the tire and to prevent the air contained in the tire from leaking from the mounting holes of the wheel rim.

Another objective of the present invention is to provide a bicycle wheel, wherein the lining strap is not driven by the tire when the tire is subjected to an external force, so that only the height and width of the tire, and the lower edge of the protruding lip of the tire is still closely hooked on a side of the respective clamping hook of the wheel rim when the protruding lip of the tire is movable relative to the wheel rim and the lining strap to prevent a gap from forming between the protruding lip of the tire and the respective clamping hook of the wheel rim and to prevent the air contained in the tire from leaking from the respective clamping hook of the wheel rim.

A further objective of the present invention is to provide a bicycle wheel, wherein the mounting holes of the wheel rim are sealed closely by the plugs to further prevent the air contained in the tire from leaking from the mounting holes of the wheel rim.

Further benefits and advantages of the present invention will become apparent after a careful reading of the detailed description with appropriate reference to the accompanying drawings.

DETAILED DESCRIPTION OF THE INVENTION

Figure 1:
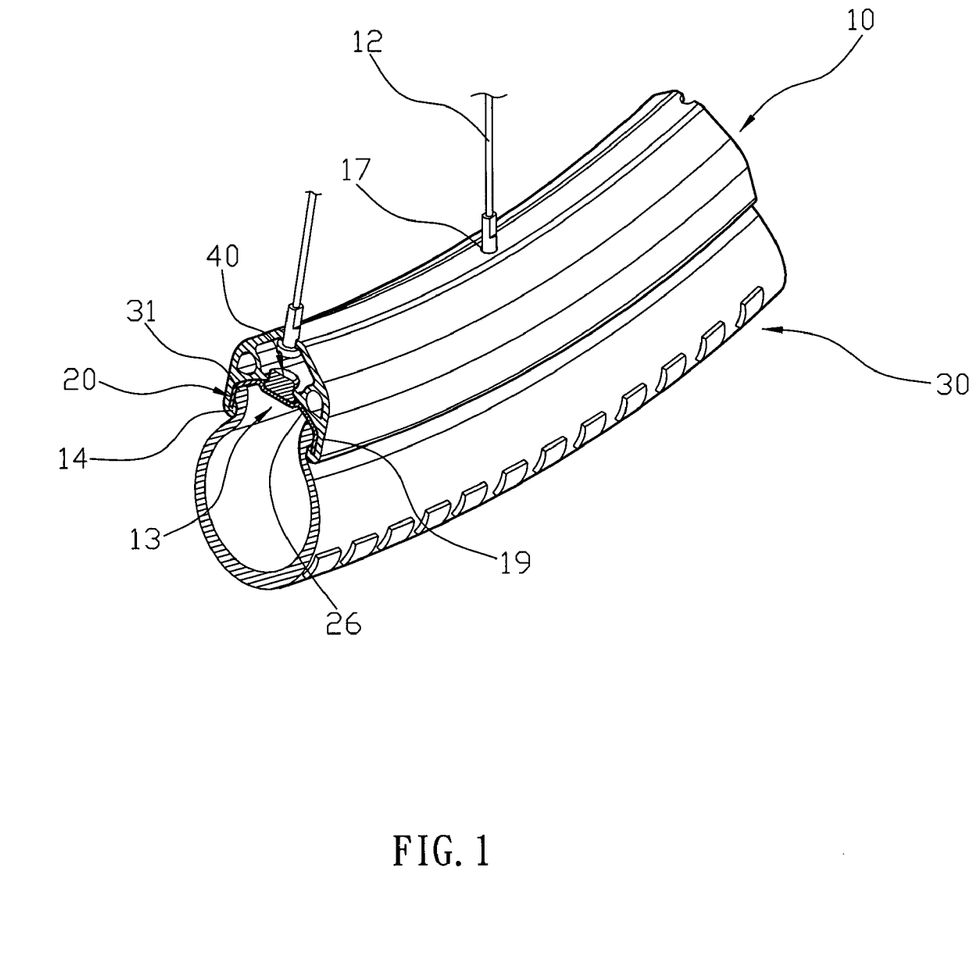
FIG. 1 is a perspective cross-sectional view of a bicycle wheel in accordance with the preferred embodiment of the present invention.
Figure 2:
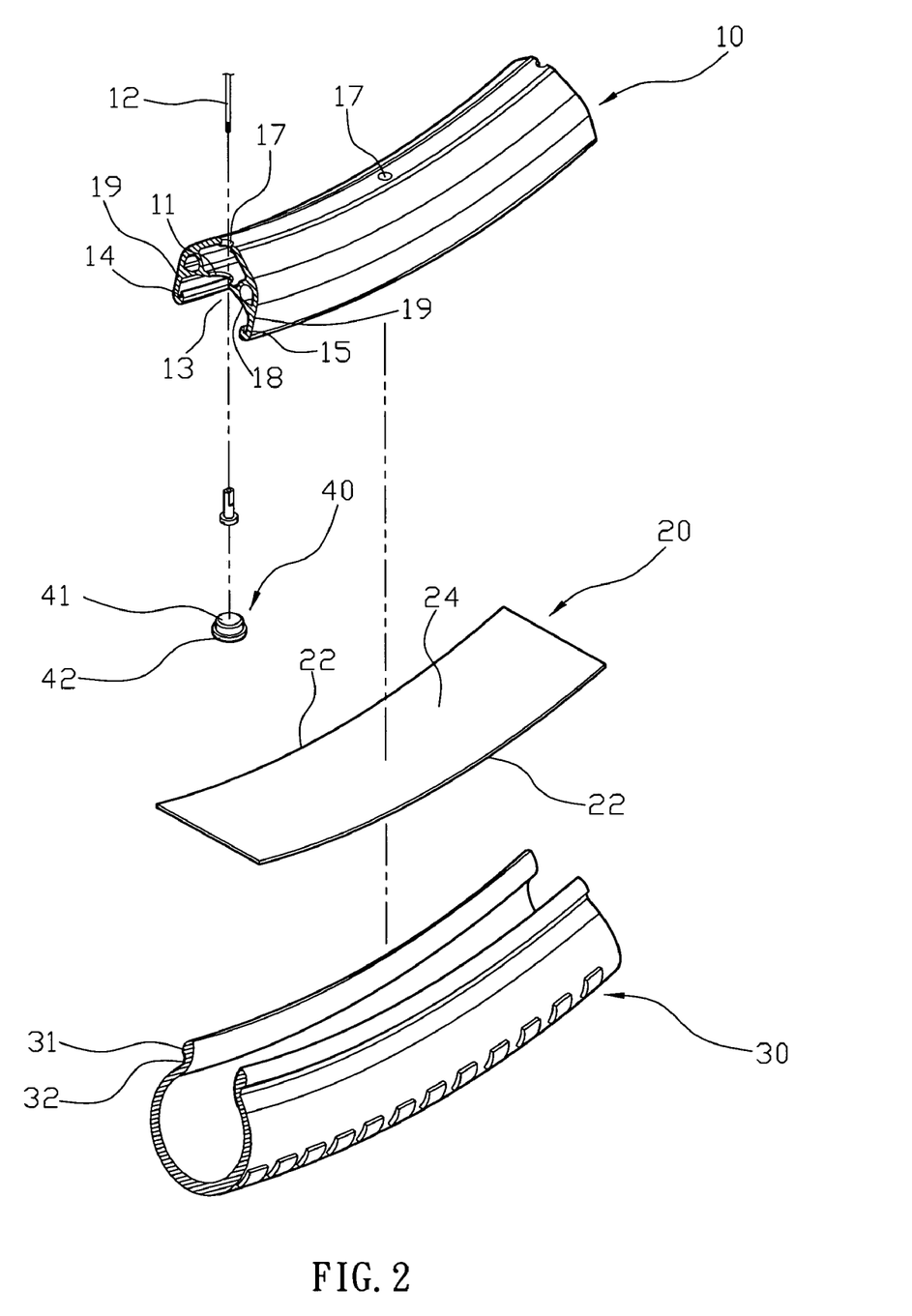
FIG. 2 is an exploded perspective view of the bicycle wheel as shown in FIG. 1.
Figure 3:
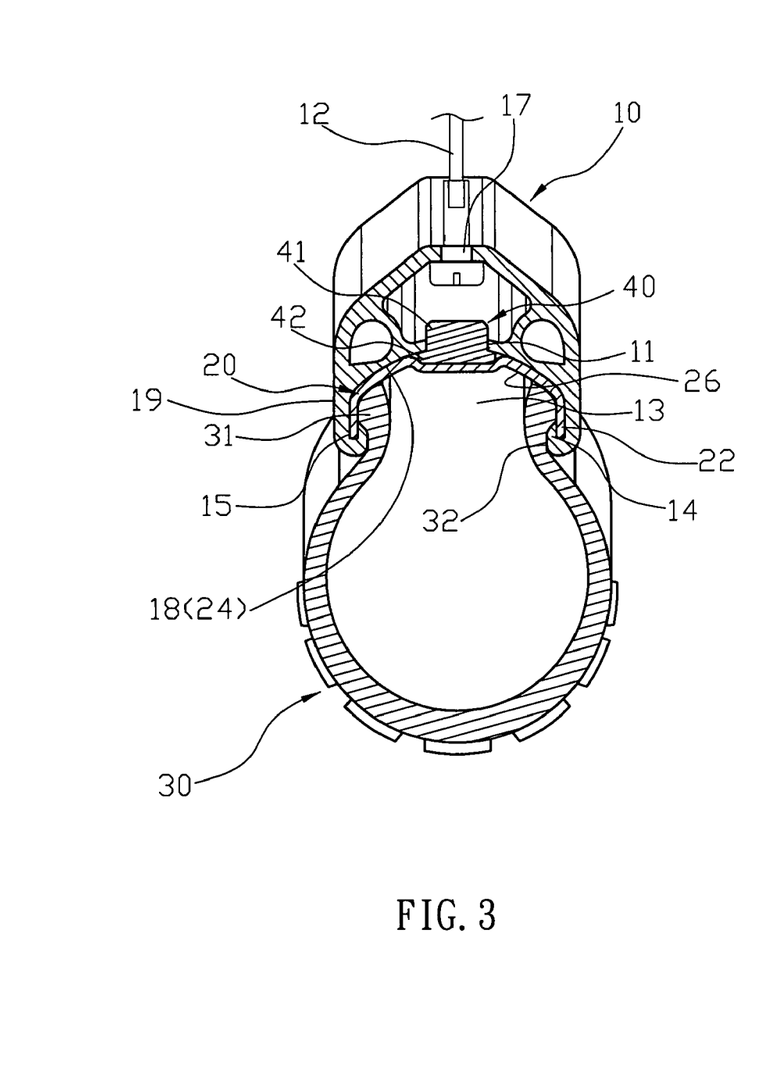
FIG. 3 is a front perspective cross-sectional view of the bicycle wheel as shown in FIG. 1.

Referring to the drawings and initially to FIGS. 1-3, a bicycle wheel in accordance with the preferred embodiment of the present invention comprises a wheel rim 10 having an outer wall formed with an opening 13 which has two opposite sidewalls 19 each having a distal end formed with a protruding clamping hook 14, wherein the clamping hook 14 of the wheel rim 10 extends axially inwardly and radially inwardly toward the opening of the wheel rim 10 to define a clamping space 15 between the clamping hook 14 and the respective sidewall 19 of the opening 13, a lining strap 20 mounted in the opening 13 of the wheel rim 10 and having two opposite edges 22 each extending radially outwardly into the clamping space 15 of the respective clamping hook 14 of the wheel rim 10 and each closely retained by the respective clamping hook 14 of the wheel rim 10 and the respective sidewall 19 of the opening 13 so that each of the two opposite edges 22 completely fills the clamping space 15 of the respective clamping hook 14 of the wheel rim 10, and a tire 30 mounted on the wheel rim 10 and having two opposite distal ends each formed with a protruding lip 31 rested on a respective edge 22 of the lining strap 20 and hooked on and located radially inward of the respective clamping hook 14 of the wheel rim 10 to attach the tire 30 to the wheel rim 10.

The wheel rim 10 has an inner wall having an outer rim formed with a plurality of mounting holes 11 each connected to the opening 13 and an inner rim formed with a plurality of fixing holes 17 for fixing a plurality of spokes 12. The clamping hook 14 of the wheel rim 10 is extended axially inwardly and radially inwardly toward the opening 13 and the lining strap 20 and has a substantially barb-shaped cross-sectional profile as shown in FIG. 3. The clamping hook 14 and the respective sidewall 19 of the opening 13 of the wheel rim 10 form a substantially U-shaped cross-sectional profile.

The bicycle wheel further comprises a plurality of plugs 40 each mounted between the wheel rim 10 and the lining strap 20. Each of the plugs 40 has a stepped shape and has a first end formed with an insertion portion 41 inserted into and protruded radially inwardly from a respective mounting hole 11 of the wheel rim 10 and a second end formed with a seal portion 42 located between the wheel rim 10 and the lining strap 20 to seal the respective mounting hole 11 of the wheel rim 10 so as to provide an air-tight effect. The insertion portion 41 of each of the plugs 40 has a diameter equal to that of the respective mounting hole 11 of the wheel rim 10 and smaller than that of the seal portion 42.

The lining strap 20 is an elongated sheet and is made of a resilient material, such as a rubber, having an air-tight effect. The lining strap 20 has a width corresponding to that of the opening 13 of the wheel rim 10. The lining strap 20 is rested on a surface 18 of the opening 13 of the wheel rim 10 smoothly. The lining strap 20 has a first face 24 rested on the seal portion 42 of each of the plugs 40 and bonded onto the surface 18 of the opening 13 of the wheel rim 10 by a gel so that the lining strap 20 is combined with the wheel rim 10 solidly and stably, and each of the plugs 40 is clamped between the wheel rim 10 and the lining strap 20 to prevent each of the plugs 40 from being detached from the respective mounting hole 11 of the wheel rim 10. The lining strap 20 has a smooth second face 26 rested on the protruding lips 31 of the tire 30 so that the protruding lips 31 of the tire 30 are movable freely on the smooth second face 26 of the lining strap 20.

The protruding lip 31 of the tire 30 has a lower edge 32 that is closely hooked on a side of the respective clamping hook 14 of the wheel rim 10 when the protruding lip 31 of the tire 30 is movable relative to the wheel rim 10 and the lining strap 20.

Figure 4:
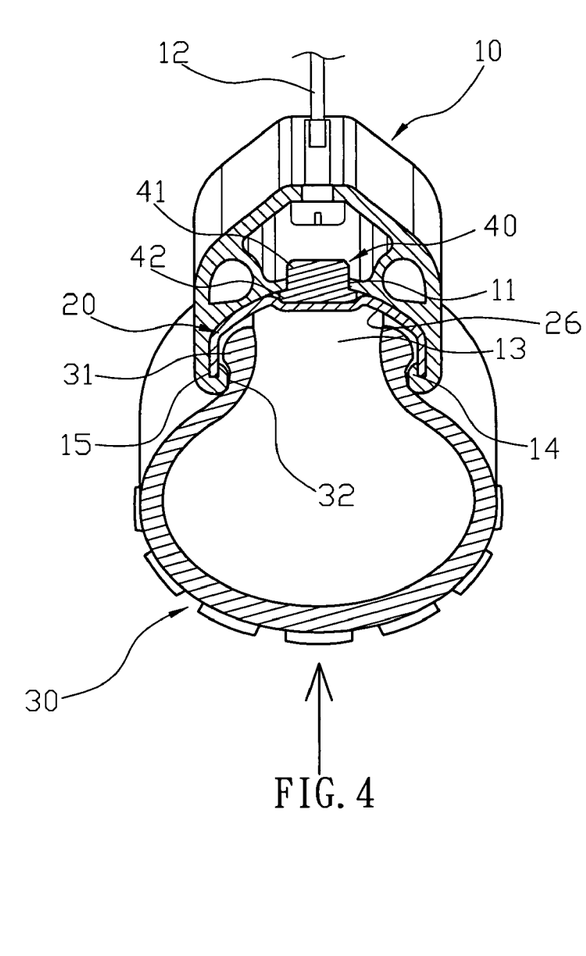
FIG. 4 is a schematic operational view of the bicycle wheel as shown in FIG. 3.

As shown in FIG. 4, when the bicycle is ridden on a rugged road, a force is applied on the tire 30. At this time, each of the edges 22 of the lining strap 20 is clamped in the clamping space 15 of the respective clamping hook 14 of the wheel rim 10 and closely retained by the respective clamping hook 14 of the wheel rim 10 and the respective sidewall 19 of the opening 13, and the protruding lips 31 of the tire 30 are movable freely on the smooth second face 26 of the lining strap 20, so that when the tire 30 is subjected to an external force, the lining strap 20 will not driven by the tire 30 to prevent a gap from forming between the lining strap 20 and the tire 30 and to prevent the air contained in the tire 30 from leaking from the mounting holes 11 of the wheel rim 10. In addition, the lining strap 20 is not driven by the tire 30 when the tire 30 is subjected to an external force, so that only the height and width of the tire 30, and the lower edge 32 of the protruding lip 31 of the tire 30 is still closely hooked on a side of the respective clamping hook 14 of the wheel rim 10 when the protruding lip 31 of the tire 30 is movable relative to the wheel rim 10 and the lining strap 20 to prevent a gap from forming between the protruding lip 31 of the tire 30 and the respective clamping hook 14 of the wheel rim 10 and to prevent the air contained in the tire 30 from leaking from the respective clamping hook 14 of the wheel rim 10. Further, the mounting holes 11 of the wheel rim 10 are sealed closely by the plugs 40 to further prevent the air contained in the tire 30 from leaking from the mounting holes 11 of the wheel rim 10.

Figure 5:
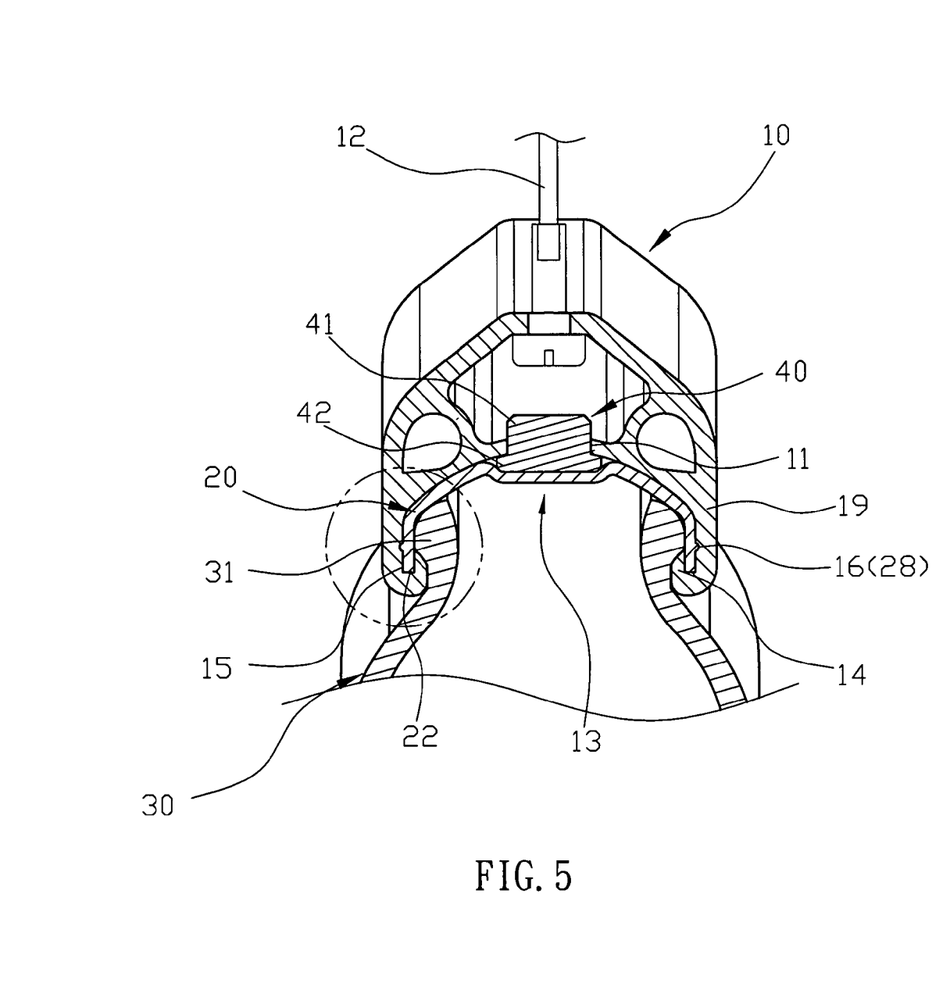
FIG. 5 is a front perspective cross-sectional view of bicycle wheel in accordance with another preferred embodiment of the present invention.
Figure 6:
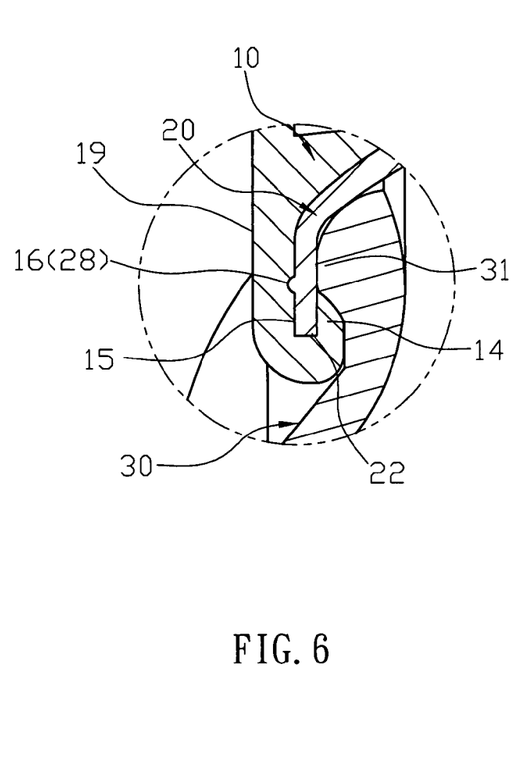
FIG. 6 is a locally enlarged view of the bicycle wheel as shown in FIG. 5.
Figure 7:
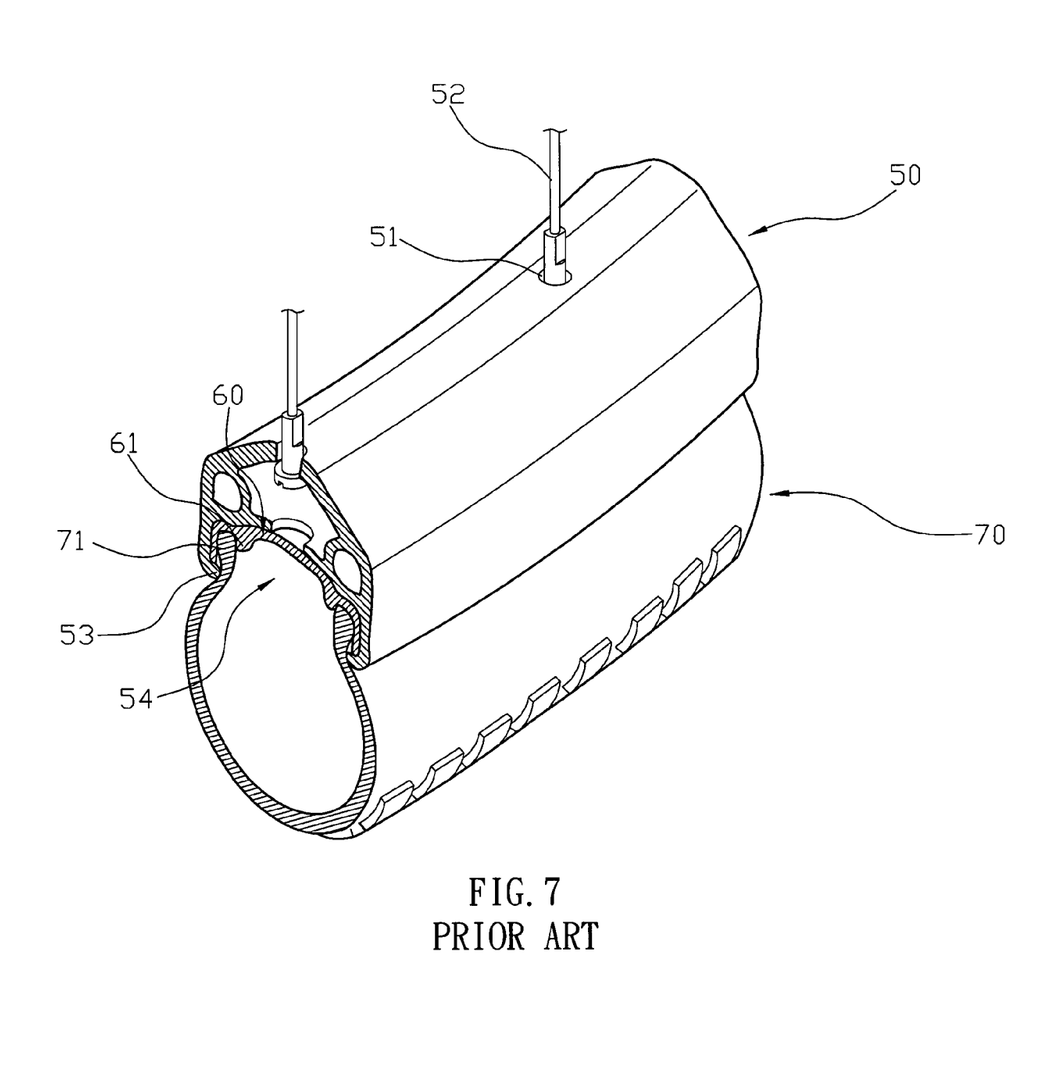
FIG. 7 is a perspective cross-sectional view of a conventional bicycle wheel in accordance with the prior art.
Figure 8:
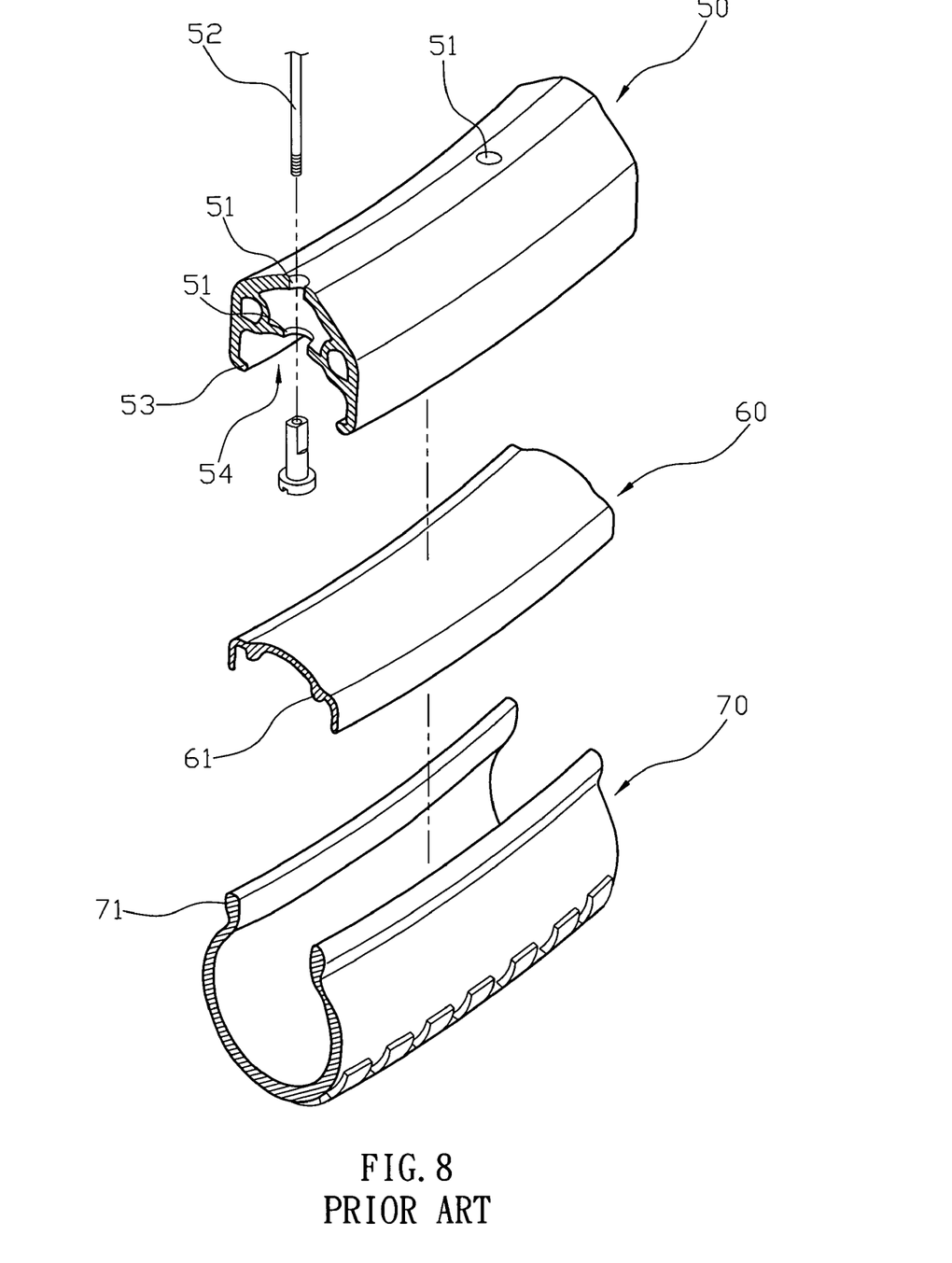
FIG. 8 is an exploded perspective view of the conventional bicycle wheel as shown in FIG. 7.
Figure 9:
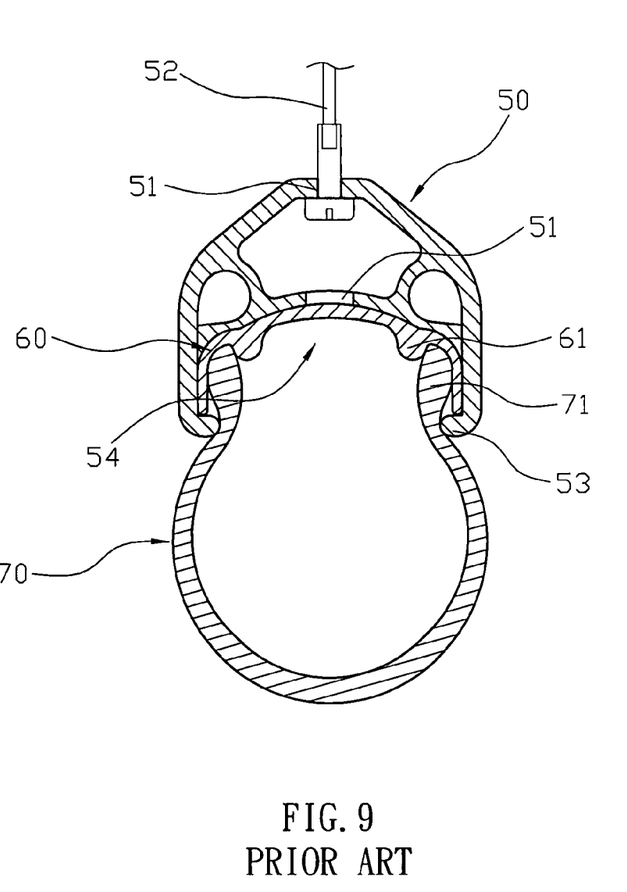
FIG. 9 is a front cross-sectional view of the conventional bicycle wheel as shown in FIG. 7.

As shown in FIGS. 5 and 6, each of the sidewalls 19 of the opening 13 of the wheel rim 10 is formed with an arcuate concave positioning groove 16 located radially inwardly of the respective clamping hook 14, and each of the edges of the lining strap 20 is formed with an arcuate convex positioning boss 28 positioned in the respective positioning groove 16 of the wheel rim 10, so that each of the edges 22 of the lining strap 20 is retained by the respective clamping hook 14 of the wheel rim 10 and the respective sidewall 19 of the opening 13 solidly and stably.

Accordingly, each of the edges 22 of the lining strap 20 is clamped in the clamping space 15 of the respective clamping hook 14 of the wheel rim 10 and closely retained by the respective clamping hook 14 of the wheel rim 10 and the respective sidewall 19 of the opening 13 so that each of the two opposite edges 22 completely fills the clamping space 15 of the respective clamping hook 14 of the wheel rim 10 and the protruding lips 31 of the tire 30 are movable freely on the smooth second face 26 of the lining strap 20, so that when the tire 30 is subjected to an external force, the lining strap 20 will not driven by the tire 30 to prevent a gap from forming between the lining strap 20 and the tire 30 and to prevent the air contained in the tire 30 from leaking from the mounting holes 11 of the wheel rim 10. In addition, the lining strap 20 is not driven by the tire 30 when the tire 30 is subjected to an external force, so that only the height and width of the tire 30, and the lower edge 32 of the protruding lip 31 of the tire 30 is still closely hooked on a side of the respective clamping hook 14 of the wheel rim 10 when the protruding lip 31 of the tire 30 is movable relative to the wheel rim 10 and the lining strap 20 to prevent a gap from forming between the protruding lip 31 of the tire 30 and the respective clamping hook 14 of the wheel rim 10 and to prevent the air contained in the tire 30 from leaking from the respective clamping hook 14 of the wheel rim 10. Further, the mounting holes 11 of the wheel rim 10 are sealed closely by the plugs 40 to further prevent the air contained in the tire 30 from leaking from the mounting holes 11 of the wheel rim 10.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A bicycle wheel, comprising:
   a wheel rim formed with an opening which has two opposite sidewalls each having a distal end formed with a protruding clamping hook to define a clamping space between the clamping hook and a respective sidewall of the opening;
   a lining strap mounted in the opening of the wheel rim and having two opposite edges each clamped in the clamping space of the respective clamping hook of the wheel rim and each retained by the respective clamping hook of the wheel rim and the respective sidewall of the opening;

a tire mounted on the wheel rim and having two opposite distal ends each formed with a protruding lip rested on a respective edge of the lining strap and hooked on the respective clamping hook of the wheel rim to attach the tire to the wheel rim;

wherein the clamping hook of the wheel rim extends axially inwardly and radially inwardly toward the opening of the wheel rim and the lining strap;

the clamping hook of the wheel rim has a substantially barb-shaped cross-sectional profile;

each of the two opposite edges of the lining strap extends radially outwardly into the clamping space of the respective clamping hook of the wheel rim and completely fills the clamping space of the respective clamping hook of the wheel rim.

2. The bicycle wheel in accordance with claim 1, further comprising a plurality of plugs each mounted between the wheel rim and the lining strap.

3. The bicycle wheel in accordance with claim 2, wherein the wheel rim is formed with a plurality of mounting holes each connected to the opening, and each of the plugs has a first end formed with an insertion portion inserted into and protruded radially inwardly from a respective mounting hole of the wheel rim and a second end formed with a seal portion located between the wheel rim and the lining strap to seal the respective mounting hole of the wheel rim so as to provide an air-tight effect.

4. The bicycle wheel in accordance with claim 3, wherein the insertion portion of each of the plugs has a diameter smaller than that of the seal portion.

5. The bicycle wheel in accordance with claim 3, wherein the wheel rim is formed with a plurality of fixing holes for fixing a plurality of spokes.

6. The bicycle wheel in accordance with claim 3, wherein the lining strap is rested on a surface of the opening of the wheel rim smoothly.

7. The bicycle wheel in accordance with claim 6, wherein the lining strap has a first face rested on the seal portion of each of the plugs and bonded onto the surface of the opening of the wheel rim so that the lining strap is combined with the wheel rim.

8. The bicycle wheel in accordance with claim 7, wherein each of the plugs is clamped between the wheel rim and the lining strap to prevent each of the plugs from being detached from the respective mounting hole of the wheel rim.

9. The bicycle wheel in accordance with claim 7, wherein the lining strap has a smooth second face rested on the protruding lips of the tire so that the protruding lips of the tire are movable freely on the smooth second face of the lining strap.

10. The bicycle wheel in accordance with claim 9, wherein the protruding lip of the tire is located radially inward of the respective clamping hook of the wheel rim and has a lower edge that is hooked on a side of the respective clamping hook of the wheel rim when the protruding lip of the tire is movable relative to the wheel rim and the lining strap.

11. The bicycle wheel in accordance with claim 9, wherein when the tire is subjected to an external force, the lining strap is not driven by the tire to prevent a gap from forming between the lining strap and the tire and to prevent air contained in the tire from leaking from the mounting holes of the wheel rim.

12. The bicycle wheel in accordance with claim 3, wherein each of the plugs has a stepped shape.

13. The bicycle wheel in accordance with claim 3, wherein the insertion portion of each of the plugs has a diameter equal to that of the respective mounting hole of the wheel rim.

14. The bicycle wheel in accordance with claim 1, wherein the lining strap is an elongated sheet.

15. The bicycle wheel in accordance with claim 1, wherein the lining strap is made of a resilient material.

16. The bicycle wheel in accordance with claim 1, wherein
the lining has a width corresponding to that of the opening of the wheel rim;
the clamping hook of the wheel rim protrudes laterally from the respective edge of the lining strap;
the protruding lip of the tire is located radially inward of the respective clamping hook of the wheel rim and is movable on the respective edge of the lining strap.

17. The bicycle wheel in accordance with claim 1, wherein each of the sidewalls of the opening of the wheel rim is formed with an arcuate concave positioning groove located radially inward of the respective clamping hook, and each of the edges of the lining strap is formed with an arcuate convex positioning boss positioned in the respective positioning groove of the wheel rim.

* * * * *